Patented Nov. 6, 1923.

1,473,544

UNITED STATES PATENT OFFICE.

JOHN C. CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

AMMONIA SYNTHESIS CATALYST AND METHOD OF MAKING THE SAME.

No Drawing.    Application filed May 17, 1921.  Serial No. 470,309.

*To all whom it may concern:*

Be it known that I, JOHN COLLINS CLANCY, a subject of the King of Great Britain, residing at Providence, in the county of Providence and State of Rhode Island, have invented certain new and useful Improvements in Ammonia Synthesis Catalysts and Methods of Making the Same, of which the following is a specification.

This invention relates to an ammonia synthesis catalyst and the method of making the same, and includes the formation of a new and useful chemical compound by a novel method of operation.

One object of the invention is to provide an improved ammonia synthesis catalyst which is capable of being prepared at a comparatively low temperature, thus lessening the cost of production and providing a catalyst superior in many respects to those requiring the use of high temperature in their preparation.

Another object of the invention is to provide an improved method of forming a catalyst of the character described herein.

A further object of the invention is to provide a new and useful chemical compound together with a novel method of forming the same.

Other objects and advantages of the invention relate to certain novel steps and combinations of steps employed in the process described together with the particular materials employed as will be more fully set forth in the detailed description to follow.

In the synthesis of ammonia from its elements various materials including carbonitrogenous compounds of alkali or alkali earth metals have been employed as catalysts for the purpose of effecting the synthesis of ammonia. It has been found that certain carbo-nitrogenous compounds of the alkali and alkali earth metals such as the cyanids and cyanamids are particularly effective for this purpose and considerable research has been directed towards the production of compounds of this character best adapted for use in promoting the desired reaction as well as the most desirable method to be employed in the preparation of the same.

While the cyanamids of various metals of the alkali or alkali earth metal groups have long been known I have been unable to find in chemical literature any reference to the cyanamids of glucinum or magnesium, the principal elements of the magnesium subgroup of the alkali earth metals.

I have found, however, that these elements are capable of uniting with carbon and nitrogen in the proper proportions for the formation of cyanamids when a suitable salt of such metal is treated with hot ammonia gas.

As an example of one method for obtaining a cyanamid of a metal of the magnesium sub-group of alkali earth metals, I start with pure or substantially pure magnesium carbonate and heat the same in the presence of ammonia gas to a temperature of approximately 500 C., the material being apparently entirely converted to magnesium cyanamid with formation of water.

I find that glucinum, the other element generally included in the magnesium subgroup of alkali earth metal, behaves in a similar manner, its carbonate being readily reduced to a cyanamid when treated with ammonia gas at an elevated temperature as described above. The substances thus obtained by treating magnesium carbonate or glucinum carbonate with hot ammonia gas are greyish white in color when first formed and turn to a dark brown or black at higher temperatures. These substances respond to the known tests for cyanamids.

Either of the above cyanamids serves as a highly efficient catalyst for the synthesis of ammonia from its elements when a mixture of nitrogen and hydrogen gases, in suitable combining proportions for the formation of ammonia are passed into contact therewith, under appropriate conditions of temperature and pressure for the carrying out of the synthetic operation.

In utilizing the above described materials for the purpose of forming ammonia synthesis catalysts I prefer, however, to form a paste of the desired salt of a metal of the magnesium sub-group of alkali metals, as, for example, magnesium carbonate, by the addition of a suitable amount of water, and thoroughly mix into the paste thus formed a heavy metal in finely divided condition, such as iron, cobalt, manganese, thorium, uranium, etc., or a suitable compound of such metal as the carbonates, oxids, hydrates, or organic salts thereof such as the acetates, oxalates, etc.

The materials are first thoroughly mixed together and then formed into lumps of from one-fourth to one-half inch in diameter and thoroughly dried by being heated to a temperature of from 100 to 150 C. While any of the above named heavy metals or compounds thereof may be advantageously used for the purpose, I prefer to employ manganese carbonate for mixing with the magnesium carbonate since, this material readily gives off its carbon and oxygen at a comparatively low temperature, as below red heat. When the material formed as above described, has been thoroughly dried it is charged into a suitable receptacle such as an iron pipe or preparing autoclave and heated in a current of dry ammonia gas to a temperature of from 300 to 600 C., whereby a catalytically active carbo-nitrogenous compound is formed which appears to consist largely of a mixture of cyanamid of magnesium and nitrid of the heavy metal used. When the heavy metal is added to the carbonate in its pure state and in finely divided form prior to the treatment with ammonia gas the resulting product appears to consist principally of magnesium cyanamid with the heavy metal distributed throughout the mass in the form of a nitrid and in finely divided form.

Although the treatment of the material with hot ammonia gas in the manner above described may be carried out at atmospheric pressure I prefer to employ a pressure somewhat in excess of normal atmospheric pressure, for instance 1 to 100 atmospheres, as I find that with pressures in excess of normal atmospheric pressure the reaction takes place more rapidly and results in a more thorough conversion of the material, while it also makes it possible to effect the conversion of the material at a lower temperature than would be possible under atmospheric pressure.

An important advantage attained by the use of a catalyst prepared as above described resides in the fact that it is not necessary to use such high temperatures in the preparation of the catalytic material as would cause sintering of the surface material and consequent densifying of the same. Moreover, the materials employed permit a wide range in the proportionate quantities of heavy metal or heavy metal compounds which may be utilized in the formation of the catalyst. In this connection it may be stated that I generally employ equal or substantially equal parts by weight of the carbonate of the magnesium sub-group and heavy metal or heavy metal compound although I may use considerably larger proportions of the heavy metal, as much as 75% by weight being capable of being advantageously employed. A further advantage to be derived from the use of the material as above described resides in the fact that in preparing a catalyst from the materials and in the manner above described, the mass may be formed into pieces of any desired size and shape prior to being treated with ammonia and these pieces of catalytic material may be made so hard under the influence of heat during the treatment that they will stand up in the autoclave without requiring any additional distributive support such as pumice stone or the like, as is ordinarily required for catalytic material formed from the cyanogen bearing compounds of the alkali or alkali earth metals.

In the treating of the material with ammonia gas as described above I prefer to use the ammonia in anhydrous or substantially anhydrous form.

By the term carbo-nitrogenous as used in the specification and claims it is my purpose to designate broadly such compounds of carbon and nitrogen as may be formed in the mass by the treatment above described whether the carbon and nitrogen are united with the metal or metals in the proportions and bonded relationship characteristic of cyanamids or not.

By reason of the comparatively low temperature required to convert the above substances into catalytically active material, sintering or densifying of the surface portions of the catalyst during the treatment is avoided, and consequently the catalyst is more readily permeated by the gases to be synthesized with consequent increased yield of ammonia.

When the catalyst has been prepared as above described I place the same in the working autoclave, being careful to exclude air therefrom during the transfer, and then pass a mixture of nitrogen and hydrogen gases into contact therewith under suitable conditions of temperature and pressure for the formation of ammonia. I have found that for the most efficient-carrying out of the synthetic operation it is desirable to use temperatures of from 400 to 550 C. while the gases to be synthesized are preferably maintained under pressure of from 15 to 100 atmospheres.

Although I have described in considerable detail certain precise steps and sequence of steps which I have found it desirable to employ, as well as certain particular substances and compounds which I have found to be efficient in use, in order to make clear to those skilled in the art one method of practicing the invention, it is to be understood that I do not desire or intend to be limited to the precise materials designated as preferred nor the exact steps or sequence steps indicated as preferred, except as the same may be included within the terms of the following claims when broadly construed in the light of my invention.

Having described my invention, what I claim is:

1. A catalyst for ammonia synthesis which comprises a carbo-nitrogenous compound of a metal of the magnesium sub-group of alkali earth metals formed by heating a carbonate of such metal in the presence of ammonia gas.

2. A catalyst for ammonia synthesis which comprises a carbo-nitrogenous compound of a metal of the magnesium sub-group of alkali earth metals associated with a finely divided heavy metal nitrid formed by heating a salt of said first named metal in the presence of a heavy metal and ammonia gas.

3. A catalyst for ammonia synthesis which comprises a carbo-nitrogenous compound of a metal of the magnesium sub-group of alkali earth metals associated with a nitrid of a heavy metal formed by heating an oxygen bearing salt of said first named metal in the presence of a heavy metal compound and ammonia gas.

4. The process of forming an ammonia synthesis catalyst which comprises, the heating of an oxygen bearing salt of a metal of the magnesium sub-group of alkali earth metals in the presence of ammonia gas.

5. The process of forming an ammonia synthesis catalyst which comprises, the heating of a carbonate of a metal of the magnesium sub-group of alkali earth metals in the presence of ammonia.

6. The process of forming an ammonia synthesis catalyst which comprises, the heating of magnesium carbonate in the presence of ammonia gas.

7. The process of forming an ammonia synthesis catalyst which comprises, the heating of an oxygen bearing salt of a metal of the magnesium sub-group of alkali earth metals in the presence of a heavy metal and ammonia gas.

8. The process of forming an ammonia synthesis catalyst which comprises, the heating of magnesium carbonate in the presence of a heavy metal and ammonia gas.

9. The process of forming an ammonia synthesis catalyst which comprises, forming a carbo-nitrogenous compound of magnesium by treating an oxygen bearing salt of said metal with ammonia gas at an elevated temperature.

10. The process of forming an ammonia synthesis catalyst which comprises, forming a carbo-nitrogenous compound of a metal of the magnesium sub-group of alkali earth metals by treating a salt of said metal with ammonia gas at an elevated temperature and under a pressure in excess of that normally exerted by the atmosphere.

11. The process of forming an ammonia synthesis cataylst which comprises, forming a carbo-nitrogenous compound of magnesium by treating a salt of said metal with ammonia gas at an elevated temperature and under a pressure in excess of that normally exerted by the atmosphere.

12. The process of forming an ammonia synthesis catalyst which comprises, treating a salt of a metal of the magnesium sub-group of alkali earth metals with hot ammonia gas in the presence of a heavy metal compound and under a pressure in excess of that normally exerted by the atmosphere.

13. The process of forming an ammonia synthesis catalyst which comprises, treating a salt of magnesium with hot ammonia gas in the presence of a heavy metal and under a pressure in excess of that normally exerted by the atmosphere.

14. The process of forming an ammonia synthesis catalyst which comprises, the heating of an oxygen bearing salt of a metal of the magnesium sub-group of alkali earth metals in the presence of a heavy metal compound and ammonia gas.

15. The process of forming an ammonia synthesis catalyst which comprises, the heating of magnesium carbonate in the presence of a heavy metal compound and ammonia gas.

16. The process of forming an ammonia synthesis catalyst which comprises, treating an oxygen bearing salt of magnesium with hot ammonia gas in the presence of a heavy metal compound.

17. The process of forming a cyanamid of magnesium which comprises, treating an oxygen bearing salt of said metal with hot ammonia gas.

18. The process of forming a cyanamid of a metal of the magnesium sub-group of alkali earth metals which comprises, treating an oxygen bearing salt of said metal with hot ammonia gas.

19. The process of forming a cyanamid of magnesium which comprises, treating magnesium carbonate with hot ammonia gas.

In testimony whereof I have affixed my signature.

JOHN C. CLANCY.